No. 875,726. PATENTED JAN. 7, 1908.
V. H. McDOWELL.
VEHICLE WHEEL AND TIRE THEREFOR.
APPLICATION FILED SEPT. 14, 1906.
2 SHEETS—SHEET 1.
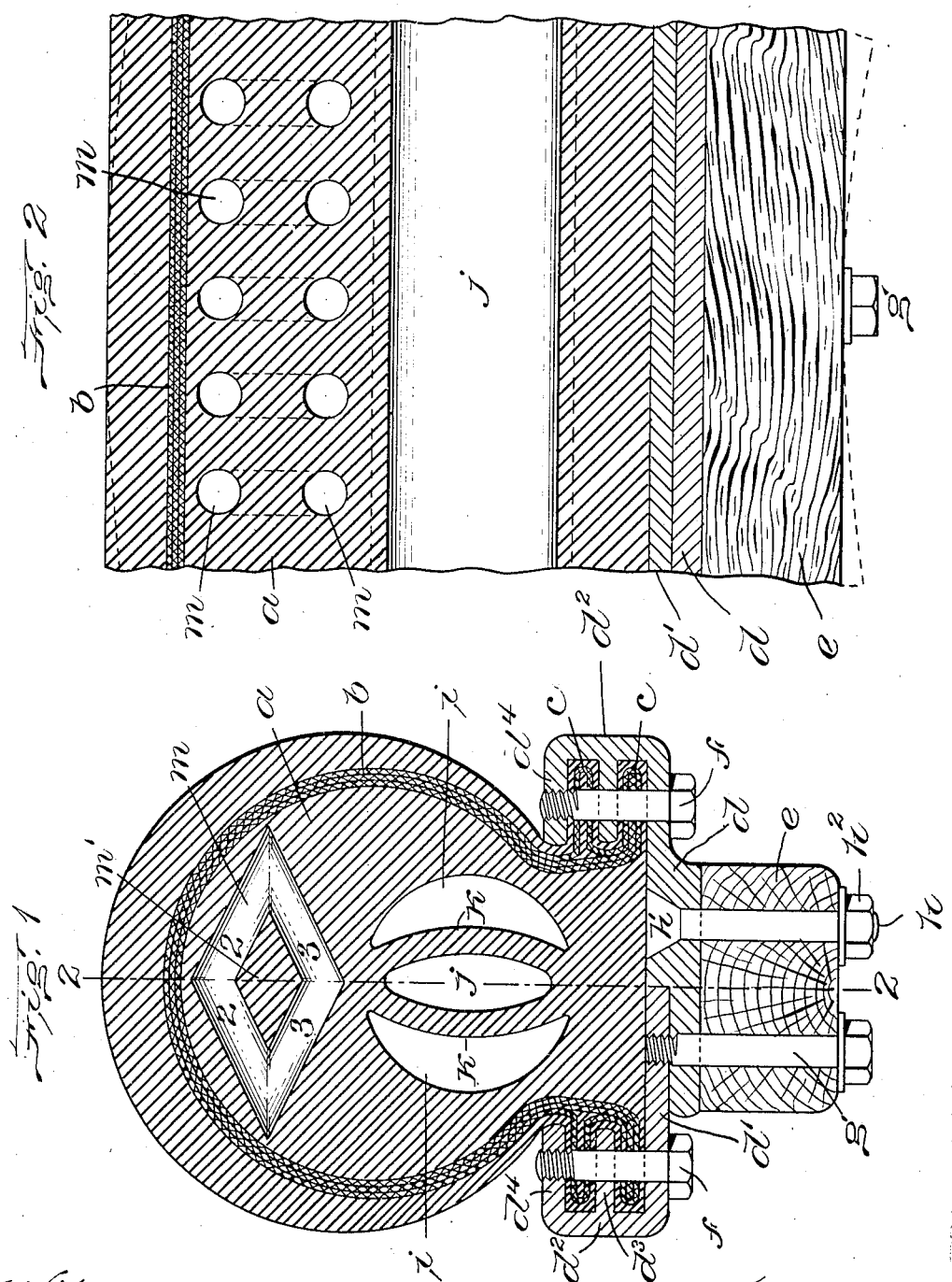
Witnesses:
Walter P. Abell
E. Batchelder
Inventor
V. H. McDowell
by Wright Brown Quinby May
Attorneys.

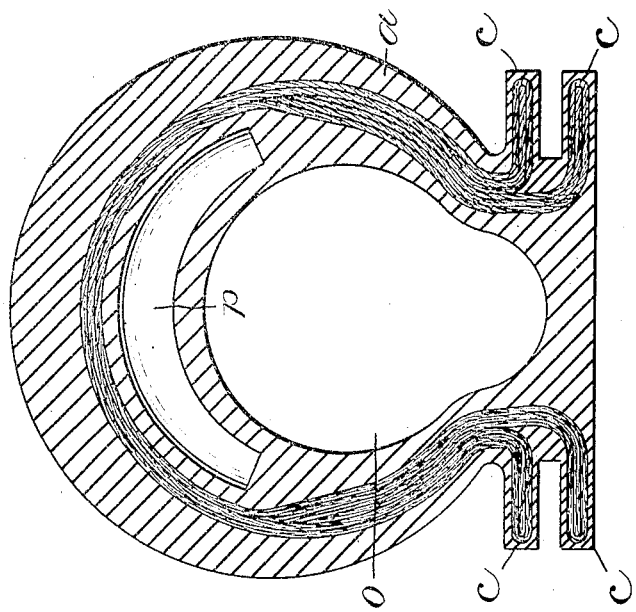
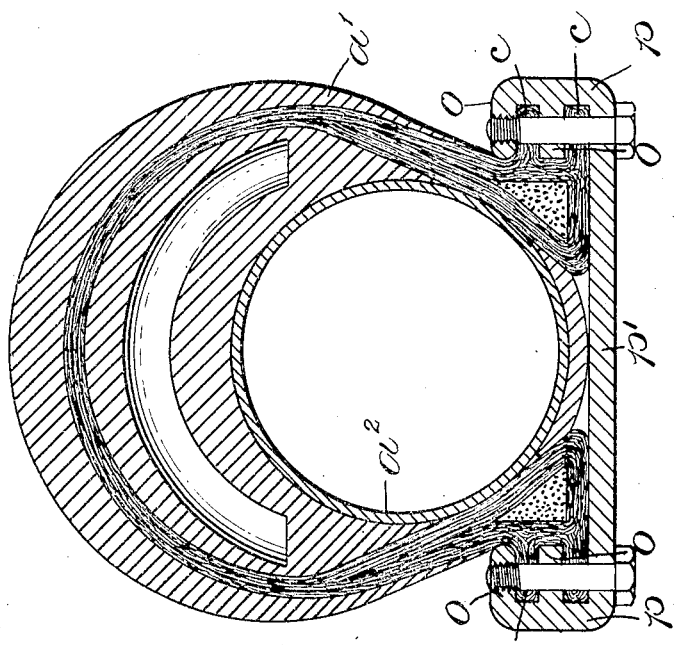

UNITED STATES PATENT OFFICE.

VALENTINE H. McDOWELL, OF LYNN, MASSACHUSETTS.

VEHICLE-WHEEL AND TIRE THEREFOR.

No. 875,726.  Specification of Letters Patent.  Patented Jan. 7, 1908.

Application filed September 14, 1906. Serial No. 334,641.

*To all whom it may concern:*

Be it known that I, VALENTINE H. MC-DOWELL, of Lynn, in the county of Essex and State of Massachusetts, have invented certain new and useful Improvements in Vehicle-Wheels and Tires Therefor, of which the following is a specification.

This invention relates to vehicle wheels, chiefly for heavy motor vehicles, having elastic tires which are capable of movement relatively to the wheel rim by the inherent resilience of the tire itself with or without the aid of a cushion of compressed air confined within the tire.

The invention has for its object, first, to provide improved means for securing an elastic tire to a wheel rim, and, secondly, to provide an improved construction in an elastic tire looking to increased resilience and desirability.

The invention consists in the improvements which I will now proceed to describe and claim.

Of the accompanying drawings forming a part of this specification,—Figure 1 represents a transverse section through the tire and rim or felly of the wheel embodying my invention. Fig. 2 represents a section on line 2—2 of Fig. 1. Figs. 3 and 4 represent sectional views showing different constructions embodying portions of my invention.

The same letters of reference indicate the same parts in all the figures.

Referring to Figs. 1 and 2, $a$ represents a cushioned tire composed of a suitable elastic material or composition such as is usually employed in making heavy tires of this character, such as a composition containing rubber, reinforced if desired by textile fabric reinforcing material $b$ inclosed in the elastic composition. The tire here shown has its inner face or the face opposite the tread surface shaped to conform to the outer surface of the wheel rim. The edges of the inner portion of the tire are provided with a plurality of concentric flanges $c\ c$, the said flanges being separated from each other by intermediate spaces. Portions of the reinforcing material $b$ are preferably extended into the said flanges as shown in Fig. 1, to give suitable strength to the flanges.

$d$ and $d'$ represent metallic rim sections which are detachably connected to each other and to the felly $e$, the outer surfaces of said sections constituting a seat on which the tire $a$ bears. The sections $d\ d'$ are provided with outwardly projecting flanges $d^2\ d^2$, each of which is provided with an inner ear $d^3$ and an outer ear $d^4$. The ears $d^3$ enter the spaces between the flanges $c\ c$ of the tire while the ears $d^4$ bear on the outer surfaces of the outer flanges $c$.

$f\ f$ represent bolts which pass through the rim sections and their ears, and through the flanges of the tire to prevent creeping of the tire.

It will be seen that the above described construction provides for a secure clenching connection between the tire and the wheel and for the detachable connection of the tire to the wheel, the rim sections $d\ d'$ being detachable from each other and independently detachable from the felly. The section $d$ is countersunk to receive the inner portion of the section $d'$, the latter being secured to the section $d$ and to the felly $e$ by means of bolts $g$ which are insertible and removable from the interior of the felly. By removing the bolts $g$, the rim section $d'$ is released and can be readily removed from the wheel and from the tire, the bolts $f$ connecting said section with the tire being removed. After this, the tire may be readily removed from the wheel after being disconnected from the rim section $d$ by the removal of the bolts $f$ connecting it therewith. The rim section $d$ is preferably attached to the felly by bolts $h$ having heads $h'$ seated in a countersunk opening in the outer portion of the section $d$ and secured by nuts $h^2$ engaged with their inner ends.

In the embodiment of my invention shown in Figs. 1 and 2, the resilience of the material of the tire is relied upon for the cushioning effect, no means for inflating the tire being provided. To provide a substitute for a compressed air cushion within the tire, I form in the inner portion of the tire a longitudinal chamber or opening $i$, to the outer and inner walls of which I attach a core composed of two side pieces $k\ k$ of the same elastic material as the tire, and united thereto by vulcanization, the said core being a part of the tire. The side pieces $k\ k$ have convex outer sides and concave inner sides, and meet at the median line of the tire, their inner sides being separated by an opening $j$. The convex sides have a lesser curvature than the adjacent sides of the chamber $i$ as shown in Fig. 1. The core formed by the side pieces constitutes practically an elliptic spring arranged with its major axis in the line of pressure. When the tread yields to external pressure the side pieces k k yield also and are flexed or bulged outwardly toward the sides of the chamber i. As the side pieces bulge, they gather force which causes them to react after the manner of compressed air confined in an air tube.

Between the tread of the tire and the opening i and its core, I form a series of laterally extending air-chambers m, each of which is preferably formed with two oppositely inclined branches 2, 2 which meet at the central portion of the tire at a point near it tread, as shown in my application for Letters Patent of the United States, filed Dec. 4, 1905, Serial No. 290,060, and with two additional oppositely inclined branches 3, 3 which meet near the center of the tire. The said branches surround a core m' and as here shown, form a chamber of rhomboidal form, although this is not essential as the branches 2, 2 and 3, 3 surrounding a core may be otherwise formed. The inner branches 3, 3 add considerably to the resilience afforded by the outer branches arranged as shown in my above mentioned application, the said inner branches permitting the portions of the tire outside the outer branches to yield more freely, as will be readily seen. By the conjoint use of the inner longitudinal air chamber with its core, and the series of transverse air chambers m having inner as well as outer branches, I obtain a tire which compares favorably as to resiliency with a pneumatic tire.

In Fig. 3, I show a compressed air chamber o adapted to be inflated instead of the air chamber i and its core. I also show transverse air chambers p between the chamber o and the tread of the tire, said chambers p having substantially the form of the chambers shown in my above mentioned application. The employment of the transverse chambers p in the tread portion of a pneumatic tire, enables a sufficient thickness of material to be provided between the tread and the compressed air chamber of a pneumatic tire, to prevent liability of puncturing the air chamber.

In Fig. 4 I show the double clencher feature of my invention embodied in an elastic tire a' which is adapted to contain an inflatable inner tube a². In this case the tire flanges c c are held by the inflated inner tube a² in engagement with ears o o formed on the flanges p at the opposite edges of the metallic rim or tire p', bolts f being preferably employed to prevent creeping of the tire.

I claim:

1. An elastic tire adapted to contain air, and provided with a plurality of clencher-engaging flanges separated by a space at each edge of its base portion, the body of the tire and said flanges being reinforced by continuous textile fabric embedded therein.

2. In combination, an elastic tire adapted to contain air, and provided with a plurality of clencher-engaging flanges separated by a space at each edge of its base portion, the body of the tire and said flanges being reinforced by continuous textile fabric embedded therein, and a wheel rim having means for engaging both sides and the spaces of said flanges.

3. An elastic tire adapted to contain air, and provided at each edge of its base portion with a plurality of clencher-engaging flanges separated by a space, said flanges and the body of the tire being reinforced by continuous textile fabric embedded therein, a wheel rim having inwardly-projecting ears adapted to enter the spaces of said flanges, and means for connecting the said ears and flanges to prevent creeping of the tire.

4. A resilient tire having a continuous longitudinal air chamber at its inner portion, and a series of transverse independent air chambers between the continuous chamber and the tread portion, each independent chamber having two oppositely inclined outer branches which meet at the central portion of the tire in close proximity to the tread, and diverge toward the edges of the tire, and two oppositely inclined inner branches extending inwardly from the outer branches, and meeting at the central portion of the tire in close proximity to the continuous air chamber.

5. A resilient tire having a series of independent transverse air chambers between its tread and inner portions, each chamber having two oppositely-inclined outer branches which meet at the central portion of the tire in relatively close proximity to the tread, and two oppositely-inclined inner branches extending inwardly from the outer branches, and meeting at the central portion of the said outer and inner branches surrounding a core which is integral with the body of the tire, the several cores and the intermediate portions of the body being circumferentially continuous.

6. A hollow, resilient tire having in its interior a continuous air chamber, and a core having walls sub-dividing said air chamber into three distinct, continuous inner chambers, said walls being curved to present convex outer sides and concave inner sides which meet substantially at the median line of the tire, said walls being of a thickness to constitute practically an elliptic spring arranged with its major axis in the line of pressure, substantially as and for the purpose set forth.

7. A resilient tire having a longitudinal air chamber subdivided by a core having longitudinally curved side pieces and independent transverse air chambers, each having two oppositely inclined outer branches which meet at the central portion of the tire in relatively close proximity to the tread, and two oppositely inclined inner branches extending from the outer ends of the outer branches, and meeting at the central portion of the tire in relatively close proximity to the longitudinal air chamber and its core.

8. A resilient tire having a longitudinal air chamber subdivided by a core having longitudinally curved side pieces, and independent transverse air chambers as described, between said longitudinal chamber and the tread portion of the tire, each chamber having outer and inner branches surrounding a core which is integral with the body of the tire, the several cores and the intermediate portions of the body constituting a circumferentially continuous core.

9. A resilient tire having a longitudinal air chamber subdivided by a core having curved side pieces, and independent transverse air chambers between said longitudinal chamber and its core, and the tread of the tire, each transverse chamber having outer and inner branches surrounding a core.

In testimony whereof I have affixed my signature, in presence of two witnesses.

VALENTINE H. McDOWELL.

Witnesses:
C. F. BROWN,
E. BATCHELDER.